US012730711B2

(12) United States Patent
Jang et al.

(10) Patent No.: US 12,730,711 B2
(45) Date of Patent: Sep. 8, 2026

(54) MEMORY INCLUDING ECC ENGINE AND OPERATION METHOD OF MEMORY

(71) Applicant: SK hynix Inc., Gyeonggi-do (KR)

(72) Inventors: Mun Seon Jang, Gyeonggi-do (KR); Sang Uhn Cha, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/441,755

(22) Filed: Feb. 14, 2024

(65) Prior Publication Data

US 2025/0130890 A1 Apr. 24, 2025

(30) Foreign Application Priority Data

Oct. 19, 2023 (KR) ........................ 10-2023-0140213

(51) Int. Cl.
*G06F 11/10* (2006.01)

(52) U.S. Cl.
CPC ........ *G06F 11/102* (2013.01); *G06F 11/1016* (2013.01); *G06F 11/1068* (2013.01)

(58) Field of Classification Search
CPC . G06F 11/102; G06F 11/1016; G06F 11/1068
See application file for complete search history.

(56) References Cited

U.S. PATENT DOCUMENTS

| | | | | |
|---|---|---|---|---|
| 9,727,412 | B2 | 8/2017 | Son et al. | |
| 2007/0277066 | A1* | 11/2007 | Gajapathy | G06F 11/1044 714/724 |
| 2013/0159815 | A1* | 6/2013 | Jung | G06F 12/00 714/763 |
| 2016/0055056 | A1* | 2/2016 | Son | G06F 11/1068 714/764 |
| 2016/0162355 | A1* | 6/2016 | Mizrachi | G11C 16/349 714/57 |
| 2021/0117257 | A1* | 4/2021 | Hoang | G06F 11/0772 |
| 2021/0149764 | A1* | 5/2021 | Chung | G06F 3/0619 |
| 2021/0311823 | A1* | 10/2021 | Schat | G06F 11/1068 |
| 2022/0368354 | A1 | 11/2022 | Lu | |

FOREIGN PATENT DOCUMENTS

| | | |
|---|---|---|
| KR | 20200051927 A | 5/2020 |
| KR | 20230080769 A | 6/2023 |

* cited by examiner

*Primary Examiner* — Thien Nguyen
(74) *Attorney, Agent, or Firm* — IP & T GROUP LLP

(57) ABSTRACT

A memory may include a memory core; an error correction code (ECC) engine that reads data and an error correction code from the memory core and detects an error in the data using the data and the error correction code; and an error information generation circuit that generates error information to be output to an outside of the memory in response to an error detection result of the ECC engine, the error information including the number of errors being less than the number of errors included in the error detection result.

9 Claims, 5 Drawing Sheets

FIG. 3A

| ERR_DET | ERR_INF | memory controller |
|---|---|---|
| NO ERROR | 00 (NE) | recognize that there is no error |
| 1-BIT ERROR | 01 (CE) | RECOGNIZE THAT 1-BIT ERROR IS FOUND BUT CORRECTED |
| 2-BIT CORRECTABLE ERROR | 01 (CE) | RECOGNIZE THAT 1-BIT ERROR IS FOUND BUT CORRECTED |
| UNCORRECTABLE ERROR OF 2 BITS OR MORE | 11 (UE) | RECOGNIZE THAT ERROR OF 2 BITS OR MORE IS FOUND AND NOT CORRECTED |

FIG. 3B

| ERR_DET | ERR_INF | MEMORY CONTROLLER |
|---|---|---|
| no error | 00 (NE) | RECOGNIZE THAT THERE IS NO ERROR |
| 1-bit error | 01 (CE) | RECOGNIZE THAT 1-BIT ERROR IS FOUND BUT CORRECTED |
| 2-bit correctable error | 11 (UE) | RECOGNIZE THAT ERROR OF 2 BITS OR MORE IS FOUND AND NOT CORRECTED |
| uncorrectable error of 2 bits or more | 11 (UE) | RECOGNIZE THAT ERROR OF 2 BITS OR MORE IS FOUND AND NOT CORRECTED |

MEMORY INCLUDING ECC ENGINE AND OPERATION METHOD OF MEMORY

CROSS-REFERENCE TO RELATED APPLICATION

This application claims priority under 35 U.S.C. § 119(a) to Korean Patent Application No. 10-2023-0140213 filed on Oct. 19, 2023, which is incorporated herein by reference in its entirety.

BACKGROUND

1. Technical Field

Embodiments of the present disclosure relate to a memory.

2. Related Art

In the early days of a semiconductor memory industry, a plurality of original good memory dies having no defective memory cells in a memory chip having passed through a semiconductor manufacturing process were distributed on a wafer. However, as the capacity of a memory device gradually increases, it has become difficult to produce a memory device having no defective memory cells. At the present time, there is no probability that such a memory device will be manufactured. As a way to overcome such a situation, a method of repairing defective memory cells of a memory device with redundancy memory cells is used.

As another way, errors associated with memory cells are corrected using an error correction circuit (ECC circuit) that corrects an error in the memory system. The errors associated with memory cells include an error which occurs in a memory cell, and an error which occurs when data is transmitted during a read and write process of a memory system.

SUMMARY

In an embodiment of the present disclosure, a memory may include: a memory core; an error correction code (ECC) engine that reads data and an error correction code from the memory core and detects an error in the data using the data and the error correction code; and an error information generation circuit that generates error information to be output to an outside of the memory in response to an error detection result of the ECC engine, the error information including the number of errors being less than the number of errors included in the error detection result.

In an embodiment of the present disclosure, a memory may include: a memory core; an error correction code (ECC) engine that reads data and an error correction code from the memory core and detects an error in the data using the data and the error correction code; and an error information generation circuit that generates error information indicating error uncorrectable to be output to an outside of the memory when an error detection result of the ECC engine indicates that an uncorrectable error of 2 bits or more is found, generates the error information indicating error correctable when the error detection result indicates that a 2-bit correctable error or a 1-bit error is found, and generates the error information indicating no error when the error detection result indicates that no error is found.

In an embodiment of the present disclosure, an operation method of a memory may include: reading, from a memory core, data and an error correction code; detecting and correcting an error of N bits in the data by using the error correction code, where N is an integer of 2 or more; generating error information including information indicating that an error of less than N bits is found in the data; and transmitting, to a memory controller, the error-corrected data and the error information.

In an embodiment of the present disclosure, a memory system may include: a memory controller; and a memory coupled to the memory controller, wherein the memory includes: a memory core; an error correction code (ECC) engine configured to read data and an error correction code from the memory core and detect an error in the data using the data and the error correction code; and an error information generation circuit configured to generate error information based on an error detection result of the ECC engine and transmit the error information to the memory controller, wherein the memory controller is configured to receive the error information, wherein the error information generation circuit is configured to: generate the error information indicating error uncorrectable when an error detection result of the ECC engine indicates that an uncorrectable error of 2 bits or more is found, generate the error information indicating error correctable when the error detection result indicates that a 2-bit correctable error or a 1-bit error is found, and generate the error information indicating no error when the error detection result indicates that no error is found.

BRIEF DESCRIPTION OF THE DRAWINGS

FIG. 3A is a diagram illustrating error information ERR_INF generated by an error information generation circuit in a correction mode in accordance with an embodiment of the present disclosure.

FIG. 3B is a diagram illustrating error information ERR_INF generated by an error information generation circuit in a non-correction mode in accordance with an embodiment of the present disclosure.

DETAILED DESCRIPTION

Various embodiments of the present disclosure are directed to providing a technology of detecting and correcting an error in a memory and reporting the detected error.

Embodiments of the present disclosure may detect and correct an error in a memory and report the error to increase the stability of a memory system.

Hereafter, embodiments in accordance with the technical spirit of the present disclosure are described with reference to the accompanying drawings.

Figure 1:
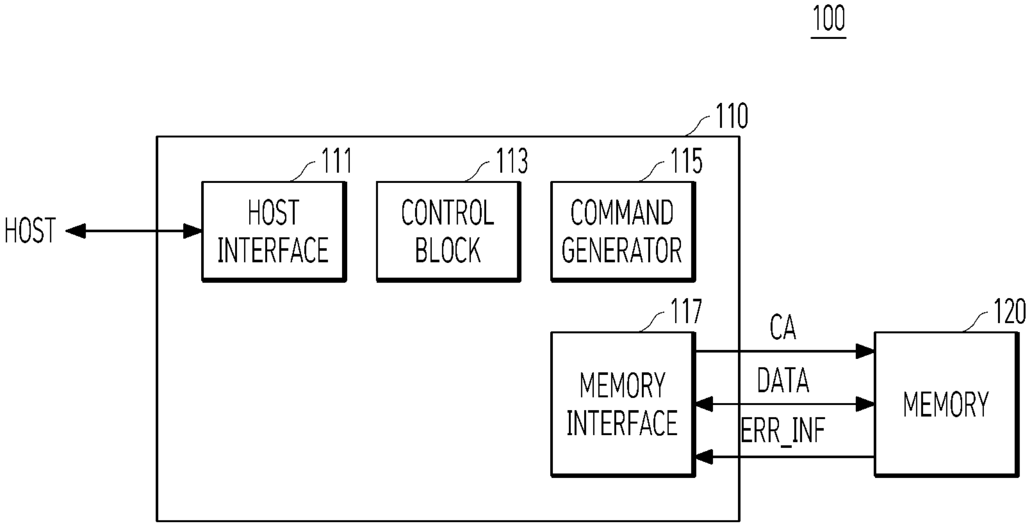
FIG. 1 is a configuration diagram of a memory system in accordance with an embodiment of the present disclosure.

FIG. 1 is a configuration diagram of a memory system 100 in accordance with an embodiment of the present disclosure.

Referring to FIG. 1, the memory system 100 may include a memory controller 110 and a memory 120. The memory controller 110 may control an operation of the memory 120 according to a request from a host HOST. The HOST may include a central processing unit (CPU), a graphics processing unit (GPU), an application processor (AP), or the like. The memory controller 110 may include a host interface 111, a control block 113, a command generator 115, and a memory interface 117. The memory controller 110 may be included in a CPU, a GPU, an AP, or the like. In such a case, the HOST may refer to a configuration other than the memory controller 110 in these configurations. For example, when the memory controller 110 is included in the CPU, the HOST in the drawing may represent the remaining components excluding the memory controller 110 from the CPU.

The host interface 111 may be an interface for communication between the HOST and the memory controller 110.

The control block 113 may control the overall operation of the memory controller 110 and schedule operations to be instructed to the memory 220. In order to improve the performance of the memory 120, the control block 113 may allow an order in which requests are received from the HOST to be different from an order of operations to be instructed to the memory 120. For example, even though the HOST requests a read operation of the memory 120 first and requests a write operation later, the order may be adjusted so that the write operation is performed before the read operation.

The command generator 115 may generate a command to be applied to the memory 120 according to an order of operations determined by the control block 113.

The memory interface 117 may be an interface for communication between the memory controller 110 and the memory 120. A command and an address CA may be transferred from the memory controller 110 to the memory 120 through the memory interface 117. Data DATA may be transmitted and received between the memory controller 110 and the memory 120 through the memory interface 117, i.e., between the memory controller 110 to the memory 120 or from the memory 120 to the memory controller. The memory interface 117 may receive error information ERR_INF from the memory 120. The memory interface 117 is also referred to as a physical (PHY) interface.

The memory 120 may perform operations instructed by the memory controller 110. The memory 120 is described in detail with reference to FIG. 2.

Figure 2:
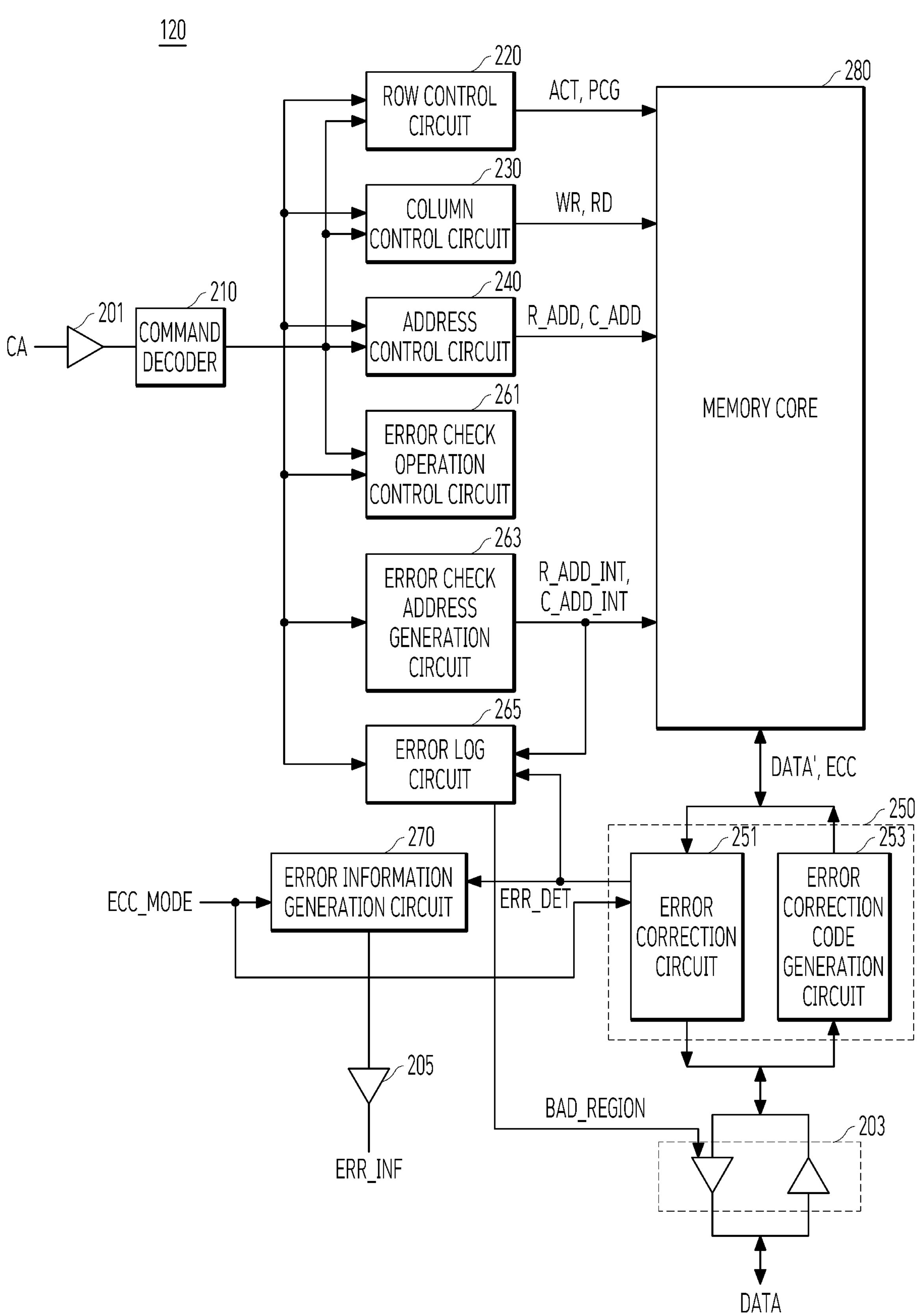
FIG. 2 is a configuration diagram of a memory in FIG. 1.

FIG. 2 is a configuration diagram of an embodiment of the memory 120 in FIG. 1.

Referring to FIG. 2, the memory 120 may include a command address reception circuit 201, a data transmission/reception circuit 203, an error information transmission circuit 205, a command decoder 210, a row control circuit 220, a column control circuit 230, an address control circuit 240, an error correction code (ECC) engine 250, an error check operation control circuit 261, an error check address generation circuit 263, an error log circuit 265, an error information generation circuit 270, and a memory core 280.

The command address reception circuit 201 may receive a command and an address CA. Depending on the type of memory 120, the command and the address CA may be input through the same input terminal, or the command and the address CA may be input through separate input terminals. FIG. 2 illustrates that the command and the address CA are input through the same input terminal. The command and the address CA may each have multi-bits.

The data transmission/reception circuit 203 may receive the data DATA from the memory controller 110 of FIG. 1 or transmit the data DATA to the memory controller 110. During a write operation, the data transmission/reception circuit 203 may receive, from the memory controller 110, data DATA to be written to the memory core 280. During a read operation, the data transmission/reception circuit 203 may transmit, to the memory controller 110, data DATA read from the memory core 280 and error-corrected by the error correction circuit 251.

The command decoder 210 may determine the type of operation instructed by the memory controller 110 to the memory 120 by decoding the command and the address CA.

When row-type operations such as an active operation and a precharge operation are instructed as a result of decoding by the command decoder 210, the row control circuit 220 may control such operations. For these operations, an active signal ACT may include a signal instructing an active operation, and a precharge signal PCG may include a signal instructing a precharge operation.

When column-based operations such as a write operation and a read operation are instructed as a result of decoding by the command decoder 210, the column control circuit 230 may control such operations. For these operations, a write signal WR may include a signal instructing a write operation, and a read signal RD may include a signal instructing a read operation.

When an error check operation mode is instructed as a result of decoding by the command decoder 210, the memory 120 may operate in the error check operation mode. In the error check operation mode, the memory 120 may operate under the control of the error check operation control circuit 261.

The address control circuit 240 may classify addresses received from the command decoder 210 into a row address R_ADD and a column address C_ADD, and transmit the row address R_ADD and the column address C_ADD to the memory core 280. When an active operation is instructed as a result of decoding by the command decoder 210, the address control circuit 240 may classify a received address as the row address R_ADD. When a read and write operation is instructed, the address control circuit 240 may classify a received address as the column address C_ADD.

The ECC engine 250 may include an error correction circuit 251 and an error correction code generation circuit 253. During a read operation, the error correction circuit 251 may detect an error in data DATA' read from the memory core 280 by using an error correction code ECC read from the memory core 280, and correct the detected error. When an error in the data DATA' is found and corrected, data DATA' input to the error correction circuit 251 may be different from data DATA output from the error correction circuit 251. The error correction circuit 251 may transfer an error detection result ERR_DET, which is a data error detection result, to the error log circuit 265 and the error information generation circuit 270.

The error correction code generation circuit 253 may generate an error correction code by using the data DATA during a write operation. During the write operation, because an error correction code is only generated using data and an error in the data DATA is not corrected, data DATA input to the error correction code generation circuit 253 from the data transmission/reception circuit 203 may be the same as data DATA' output from the error correction code generation circuit 253 to the memory core 280.

Specifications for the error correction capability of the ECC engine 250 embedded in the memory 120 may be defined. For example, there are specifications that the ECC engine 250 embedded in the memory 120 needs to be able to correct 1-bit errors in read data. The ECC engine 250 may also have an error correction capability that exceeds an error correction capability defined in specifications (hereinafter referred to as particular or required error correction capability). That is, the ECC engine 250 with the required error correction capability may also be embedded in the memory 120. For example, the memory system 100 may require that the ECC engine 250 embedded in the memory 120 needs to be able to correct 1-bit errors, but the ECC engine 250 embedded in the memory 120 may correct not only 1-bit errors but also some pattern errors among 2-bit errors. Hereinafter, the error correction capability required for the memory 120 in the memory system 100 is 1-bit error correction, but the ECC engine 250 of the memory 120 may have the ability to correct even some pattern errors among 2-bit or more errors beyond the requirements of the memory system 100.

The error correction circuit 251 of the ECC engine 250 may be able to set a mode among a correction mode and an uncorrected mode. The correction mode may correspond to an ECC mode signal ECC_MODE at a logic '1' level. The uncorrected mode may correspond to the ECC mode signal ECC_MODE is at a logic '0' level. In the correction mode, the error correction circuit 251 may correct all correctable errors. For example, when a 2-bit correctable error is found, the error correction circuit 251 may correct the error. In the uncorrected mode, the error correction circuit 251 might not correct errors that exceed the required error correction capability. For example, when a 1-bit error is found, the error correction circuit 251 may correct the error, but when a 2-bit correctable error is found, the error correction circuit 251 might not correct the error.

In response to an error detection result ERR_DET of the ECC engine 250, the error information generation circuit 270 may generate error information ERR_INF to be output to the outside of the memory 120. The error information ERR_INF may be transmitted to the memory controller 110 through the error information transmission circuit 205 each time a read operation is performed. The error information ERR_INF may be output from the memory 120 to the memory controller 110 through an unused pad of the memory 120. For example, a data mask inversion (DMI) pad of the memory 120 is not used during a read operation, and the error information transmission circuit 205 may transmit the error information ERR_INF through the DMI pad.

In the correction mode, the error information generation circuit 270 may generate the error information ERR_INF so that the number of errors included in the error information ERR_INF is less than the number of errors included in the error detection result ERR_DET. For example, when the error detection result ERR_DET includes information indicating that an error of N bits, where N is an integer of 2 or more, is found in the data DATA', the error information ERR_INF may include information indicating that an error of less than N bits is found in the data DATA'.

FIG. 3A is a diagram illustrating error information ERR_INF generated by the error information generation circuit 270 in the correction mode in accordance with an embodiment of the present disclosure. Referring to FIG. 3A, when no error is found or detected by the error correction circuit 251 (ERR_DET=no error), the error information ERR_INF may be generated as '00' indicating no error (NE). When the error information (ERR_INF='00') is transmitted to the memory controller 110, the memory controller 110 may recognize that there is no error in the memory 120.

When a 1-bit error is found or detected by the error correction circuit 251 (ERR_DET=1-bit error), the error information ERR_INF may be generated as '01' indicating a correctable error (CE). When the error information (ERR_INF='01') is transmitted to the memory controller 110, the memory controller 110 may recognize that the 1-bit error has been found in the memory 120 and has been corrected.

When a 2-bit correctable error is found or detected by the error correction circuit 251 (ERR_DET=2-bit correctable error), the error information ERR_INF may be generated as '01' indicating a correctable error (CE). When the error information (ERR_INF='01') is transmitted to the memory controller 110, the memory controller 110 may recognize that a 1-bit error has been found in the memory 120 and has been corrected. That is, a 2-bit error has been found and corrected in the memory 120, but it may be reported to the memory controller 110 that a 1-bit error has been found and corrected. This is because the ECC engine 250 of the memory 120 has an error correction capability that exceeds the required error correction capability of the specifications, and even when a 2-bit error has been found, because the 2-bit error has been corrected, the stability of the system might not be problematic even though the memory controller 110 recognizes that a 1-bit error has been found and corrected.

When an uncorrectable error of 2 bits or more is found or detected by the error correction circuit 251 (ERR_DET=uncorrectable error of 2 bits or more), the error information ERR_INF may be generated as '11' indicating an uncorrectable error (UE). When the error information (ERR_INF='11') is transmitted to the memory controller 110, the memory controller 110 may recognize that an error of 2 bits or more has been found in the memory 120 and has not been corrected.

FIG. 3B is a diagram illustrating error information ERR_INF generated by the error information generation circuit 270 in the uncorrected mode in accordance with an embodiment of the present disclosure. Referring to FIG. 3B, when no error is found or detected by the error correction circuit 251 (ERR_DET=no error), the error information ERR_INF may be generated as '00' indicating no error (NE). When the error information (ERR_INF='00') is transmitted to the memory controller 110, the memory controller 110 may recognize that there is no error in the memory 120.

When a 1-bit error is found or detected by the error correction circuit 251 (ERR_DET=1-bit error), the error information ERR_INF may be generated as '01' indicating a correctable error (CE). When the error information (ERR_INF='01') is transmitted to the memory controller 110, the memory controller 110 may recognize that a 1-bit error has been found in the memory 120 and has been corrected.

When a 2-bit correctable error is found or detected by the error correction circuit 251 (ERR_DET=2-bit correctable error), the error information ERR_INF may be generated as '11' indicating an uncorrectable error (UE). When the error information (ERR_INF='11') is transmitted to the memory controller 110, the memory controller 110 may recognize that an error of 2 bits or more has been found in the memory 120 and has not been corrected. In the uncorrected mode, even though a 2-bit correctable error is found, because the error correction circuit 251 does not correct the error, there may be no problem in recognition by the memory controller 110.

When an uncorrectable error of 2 bits or more is found or detected by the error correction circuit 251 (ERR_DET=uncorrectable error of 2 bits or more), the error information ERR_INF may be generated '11' indicating an uncorrectable error (UE). When the error information (ERR_INF='11') is transmitted to the memory controller 110, the memory controller 110 may recognize that an error of 2 bits or more has been found in the memory 120 and has not been corrected.

Referring again to FIG. 2, the error check operation control circuit 261 may control the error check operation of the memory 120. The error check operation is also referred to as an error check and scrub (ECS) operation. The error check operation may include an operation of reading the data DATA' and the error correction code ECC from the memory core 280, checking an error by using the error correction circuit 251, and selecting a particular region (e.g., cell or row) among memory cells in the memory core 280, which includes errors. Data error-corrected by the error correction circuit 251 may be written to the memory core 280 again. When the error check operation mode is set, the error check operation control circuit 261 may control the error check operation. Because the error check operation requires control of rows and columns of the memory core 280, the error check operation circuit 261 may control the row control circuit 220 and the column control circuit 230 during the error check operation. The error check operation circuit 261 may also control the error check address generation circuit 263 and the error log circuit 265 related to the error check operation.

The error check address generation circuit 263 may generate internal addresses R_ADD_INT and C_ADD_INT to be used for the error check operation. The internal addresses may include an internal row address R_ADD_INT and an internal column address C_ADD_INT. The error check address generation circuit 263 may change the internal addresses R_ADD_INT and C_ADD_INT each time the error check operation is performed. The error check address generation circuit 263 may increase the internal addresses R_ADD_INT and C_ADD_INT by one step each time the error check operation is performed. When the range of a value of the internal row address R_ADD_INT is 0 to X and the range of a value of the internal column address C_ADD_INT is 0 to Y, the error check address generation circuit 263 may generate the internal addresses R_ADD_INT and C_ADD_INT as (0, 0) during a first error check operation. During a second error check operation, the error check address generation circuit 263 may generate the internal addresses R_ADD_INT and C_ADD_INT as (0, 1) by increasing the internal addresses R_ADD_INT and C_ADD_INT by one step. Likewise, during a third error check operation, the error check address generation circuit 263 may generate the internal addresses R_ADD_INT and C_ADD_INT as (0, 2) by increasing the internal addresses R_ADD_INT and C_ADD_INT by one step. The internal addresses R_ADD_INT and C_ADD_INT may increase by one step each time the error check operation is performed such that the internal addresses (Row address, Column address) are generated in order of: (0, 0)→(0, 1)→(0, 2)→ . . . →(0, Y−1)→(0, Y)→(1, 0)→(1, 1)→ . . . →(1, Y−1)→(1, Y)→(2, 0)→(2, 1)→ . . . →(X, Y−1)→(X, Y). Because the error check address generation circuit 263 changes the internal addresses R_ADD_INT and C_ADD_INT each time the error check operation is performed, when the error check operation is repeatedly performed, the error check operation may be performed on all memory cells of the memory core 280.

The error log circuit 265 may be a circuit for logging the history of errors found during the error check operation. The error log circuit 265 may count and store the number of times an error has been found for each region (for example, for each row) of the memory core 280, and classify, into bad regions, regions where many errors which exceed a threshold, have been found. Because the error log circuit 265 receives the internal addresses R_ADD_INT and C_ADD_INT and the error detection result ERR_DET, the error log circuit 265 may ascertain a region of the memory core 280 where an error has been found during the error check operation. When there is a request from the memory controller 110, bad region information BAD_REGION classified by the error log circuit 265 may be transmitted to the memory controller 110 through the data transmission/reception circuit 203. In some embodiments, the bad region information BAD_REGION may include an address of a region classified into a bad region in the memory core 280 and information on the number of errors found in the region.

When a 1-bit error is found in the error detection result ERR_DET, the error log circuit 265 may increase the error count of a corresponding region by a particular value, e.g., +1. When an uncorrectable error of 2 bits or more is found, the error log circuit 265 may increase the error count of the corresponding region by a particular value, e.g., +2. When a 2-bit correctable error is found, the error count of the corresponding region may be set to a particular value, e.g., +1, or the error count of the corresponding region may be set to a particular value, e.g., +2.

The memory core 280 may perform operations instructed by internal command signals ACT, PCG, WR, and RD. The memory core 280 may include configurations for operations such as active, precharge, read, and write, such as a cell array including memory cells arranged between a plurality of rows and a plurality of columns. Further, the memory core 280 may include a row decoder for activating/deactivating rows of the cell array, a column decoder for inputting/outputting data from the cell array, and an input/output circuit. When an active signal ACT is activated, a row selected by a row address R_ADD among the rows of the memory core 280 may be activated. When a precharge signal PCG is activated, the activated row may be deactivated. When a write signal WR is activated, the data DATA' and the error correction code ECC may be written to memory cells of columns selected by a column address C_ADD among the columns of the memory core 280. When a read signal RD is activated, the data DATA' and the error correction code ECC may be read from the memory cells of the columns selected by the column address C_ADD among the columns of the memory core 280. During the error check operation, the internal addresses R_ADD_INT and C_ADD_INT generated by the error check address generation circuit 263 may be used instead of the addresses R_ADD and C_ADD of the address control circuit 240.

Figure 4:
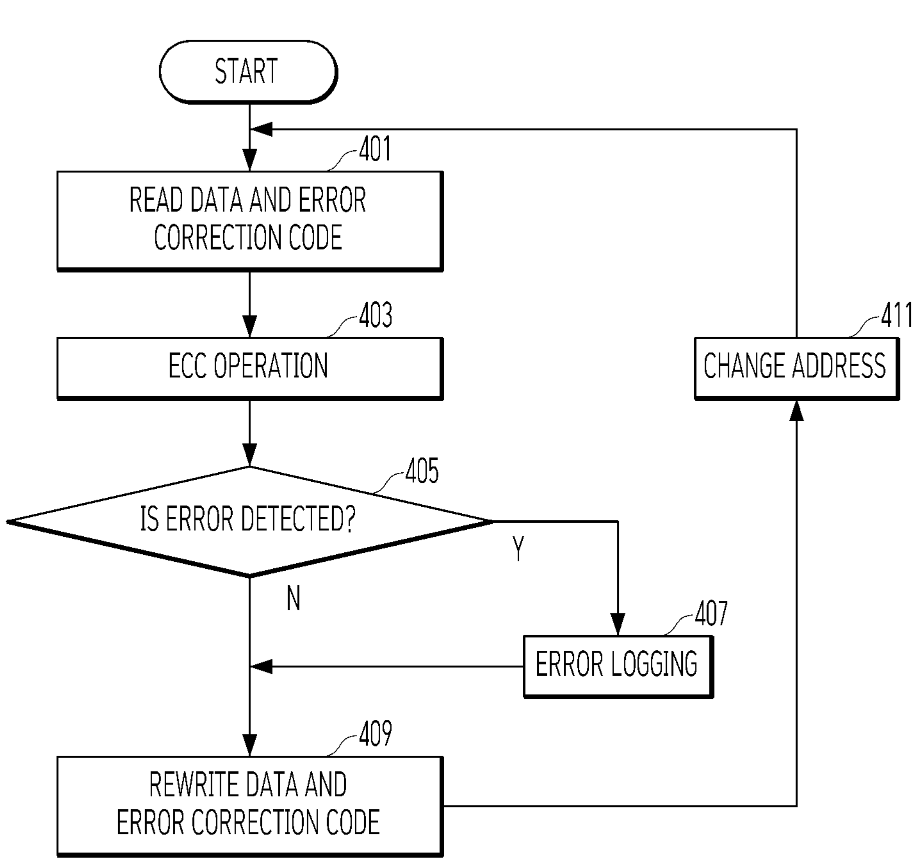
FIG. 4 is a diagram illustrating an error check operation of the memory in FIG. 2 in accordance with an embodiment of the present disclosure.

FIG. 4 is a diagram illustrating the error check operation of the memory 120 in FIG. 2 in accordance with an embodiment of the present disclosure.

Referring to FIG. 4, the data DATA' and the error correction code ECC may be first read from memory cells selected by the internal addresses R_ADD_INT and C_ADD_INT, in the memory core 280 (401).

The error correction circuit 251 of the ECC engine 250 may detect and correct errors in the data DATA' by using the error correction code ECC (403).

When an error is detected (Y in 405), the detected error may be logged in the error log circuit 265 (407). As described above, the error log circuit 265 may count the number of errors found in each region of the memory core 280. When a 1-bit error is found in the error detection result ERR_DET of the ECC engine 250, the error log circuit 265 may increase the error count of a corresponding region by a particular value, e.g., +1. When an uncorrectable error of 2 bits or more is found, the error log circuit 263 may increase the error count of a corresponding region by a particular value, e.g., +2. When a 2-bit correctable error is found, the error count of a corresponding region may be set to a particular value, e.g., +1, or the error count of the corresponding region may be set to a particular value, e.g., +2.

The data DATA' error-corrected by the ECC engine 250 and the error correction code ECC may be rewritten to the memory core 280 again (409). The read operation (401) and the rewrite operation (409) may be performed on the same memory cells of the memory core 480.

Subsequently, the error check address generation circuit 263 may change the values of the internal addresses R_ADD_INT and C_ADD_INT (411), and operations (401 to 409) may be performed again using the changed internal addresses R_ADD_INT and C_ADD_INT.

Although embodiments according to the technical idea of the present disclosure have been described above with reference to the accompanying drawings, this is only for describing the embodiments according to the concept of the present disclosure, and the present disclosure is not limited to the above embodiments. Various types of substitutions, modifications, and changes for the embodiments may be made by those skilled in the art, to which the present disclosure pertains, without departing from the technical idea of the present disclosure defined in the following claims, and it should be construed that these substitutions, modifications, and changes belong to the scope of the present disclosure.

In the above-described embodiments, all operations may be selectively performed, or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

The embodiments of the present disclosure have been described in the drawings and specification. Although specific terminologies are used here, those are only to describe the embodiments of the present disclosure. Therefore, the present disclosure is not restricted to the above-described embodiments and many variations are possible within the scope of the present disclosure. It should be apparent to those skilled in the art that various modifications can be made on the basis of the technological scope of the present disclosure in addition to the embodiments disclosed herein. Furthermore, the embodiments may be combined to form additional embodiments.

What is claimed is:

1. A memory comprising:

a memory core;

an error correction code (ECC) engine that reads data and an error correction code from the memory core and detects an error in the data using the data and the error correction code; and an error information generation circuit that generates error information to be output to a memory controller outside of the memory in response to an error detection result of the ECC engine, wherein, when an actual number of errors is two or more, the error information generation circuit is configured to generate the error information to include an outputted number of errors transmitted to the memory controller that is less than the actual number of errors detected by the ECC engine such that the outputted number of errors does not exceed an error correction capability specified for the ECC engine so that the ECC engine in a correction mode corrects errors beyond the error correction capability specified for the ECC engine, and wherein, when no error is found, the error information outputted to the memory controller indicates that no error was found.

2. The memory of claim 1, wherein, when the error detection result indicates that an error of N bits, where N is an integer of 2 or more, is found in the data, and when the error information indicates the error is uncorrectable, the error information generation circuit generates the error information to include information indicating that an error being less than N bits is found.

3. A memory comprising:

a memory core;

an error correction code (ECC) engine that reads data and an error correction code from the memory core and detects an error in the data using the data and the error correction code; and an error information generation circuit that generates error information indicating detected uncorrectable errors to be output to a memory controller outside of the memory when an error detection result of the ECC engine indicates that an uncorrectable error of 2 bits or more is found so that the ECC engine in a correction mode corrects the uncorrectable error of 2 bits or more even when a number of the detected uncorrectable errors exceeds an error correction capability specified for the ECC engine, generates and transmits the error information to the memory controller indicating a correctable 1-bit error when the error detection result indicates that a 2-bit correctable error or a 1-bit error is found so that the ECC engine in the correction mode corrects the 2-bit correctable error or the 1-bit error, and generates the error information indicating no error when the error detection result indicates that no error is found.

4. The memory of claim 3, wherein the memory controller that receives the error information and determines, based on the error information, that an error of 2 bits or more is found in the memory when the error information indicates error uncorrectable, determines that a 1-bit error is found in the memory when the error information indicates error correctable, and determines that no error is found in the memory when the error information indicates no error.

5. The memory of claim 3, wherein in a first mode, the error information generation circuit generates the error information indicating error uncorrectable when the error detection result indicates that the uncorrectable error of 2 bits or more is found, generates the error information indicating error correctable when the error detection result indicates that the 2-bit correctable error or the 1-bit error is found, and generates the error information indicating no error when the error detection result indicates that no error is found, and in a second mode, the error information generation circuit generates the error information indicating error uncorrectable when the error detection result indicates that an error of 2 bits or more is found, generates the error information indicating error correctable when the error detection result indicates that the 1-bit error is found, and generates the error information indicating no error when the error detection result indicates that no error is found.

6. The memory of claim 5, wherein in the correction mode, the ECC engine corrects errors in the read data when the 2-bit correctable error is found, and in an uncorrected mode, the ECC engine does not correct the errors in the read data when the 2-bit correctable error is found.

7. The memory of claim 3, further comprising:

an error log circuit for logging an error detection history of the ECC engine, wherein the error log circuit counts the number of errors by 2 when the error detection result indicates that the 2-bit correctable error is found, and counts the number of errors by 1 when the error detection result indicates that the 1-bit error is found.

8. The memory of claim 3, further comprising:

an error log circuit for logging an error detection history of the ECC engine, wherein the error log circuit counts the number of errors by 1 when the error detection result indicates that the 2-bit correctable error and the 1-bit error are found.

9. An operation method of a memory, the operation method comprising:

reading, from a memory core, data and an error correction code;

detecting and correcting with an error correction code (ECC) engine an error of N bits, comprising an error count of N errors, in the data by using the error correction code, where N is an integer of 2 or more;

generating error information including information indicating that the error count found in the data is less than N errors, regardless of an actual number of bits of the detected error; and transmitting, to a memory controller, the error-corrected data and the error information, wherein, when the error count is two or more, the error count transmitted to the memory controller does not exceed an error correction capability specified for the ECC engine so that the ECC engine in a correction mode corrects errors beyond the error correction capability specified for the ECC engine, and wherein, when no error is found, the error information transmitted to the memory controller indicates that no error was found.

* * * * *